3,530,120
NOVEL PROCESS FOR PREPARATION OF ENAMINES

Hubert von Hirsch, 20 Jahnstrasse, 8032 Grafelfing, Germany
No Drawing. Filed Feb. 2, 1967, Ser. No. 613,444
Claims priority, application Germany, Feb. 21, 1966, H 58,613
Int. Cl. C07c *85/08;* C07d *27/26, 29/10*
U.S. Cl. 260—240         5 Claims

ABSTRACT OF THE DISCLOSURE

Preparation of enamines by reaction of an aldehyde or a ketone with a tris-(sec. amino)-arsine, said enamines being intermediates and as monomers for copolymerization with other compounds.

PRIOR ART

The preparation of enamines by the direct reactions of aldehydes or ketones with secondary amines has been described by Mannich et al. (Ber., Vol. 69, 1936, p. 2106). The reaction proceeds according to the following equation:

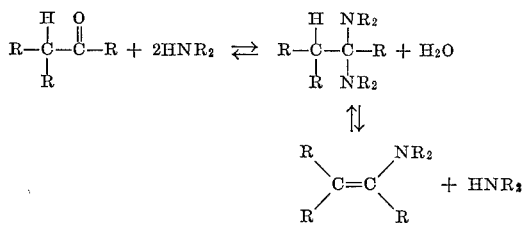

The water of reaction formed is either chemically bonded (for example with anhydrous alkali metal carbonates, alkaline earth oxides and the like), or in some cases it is azeotropically distilled off together with the solvent. Other processes for the preparation of enamines based on the above reaction (Mannich process) are summarized in the first chapter of the text "Advance in Organic Chemistry," Methods and Results, Vol. 4 (1963).

OBJECTS OF THE INVENTION

It is an object of the invention to provide a novel process for the preparation of enamines from an aldehyde or ketone.

It is another object of the invention to provide a novel process for the preparation of bis-(dilower alkyl amino)-compounds.

These and other objects and advantages of the invention will become obvious from the following detailed description.

The novel process of the invention for the preparation of enamines of the formula

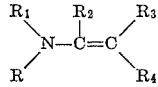

wherein R and $R_1$ are lower aliphatic radicals of 1 to 7 carbon atoms and when taken together with the nitrogen atom to which they are attached form a 5 to 6 member heterocyclic ring and $R_2$, $R_3$ and $R_4$ are selected from the group consisting of hydrogen, aliphatic, aromatic or heterocyclic and $R_2$ and $R_3$ when taken together with the carbon atoms to which they are bonded form an alicyclic or heterocyclic ring comprises reacting a compound of the formula

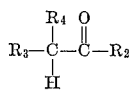

wherein $R_2$, $R_3$ and $R_4$ have the above definitions in an inert atmosphere with a tris-(sec.-amino)-arsine of the formula

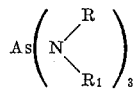

wherein R and $R_1$ have the above definitions to form the corresponding enamine. The reaction scheme of the process is as follows

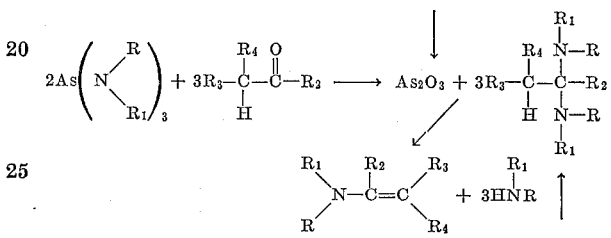

Depending upon the specific ketone or aldehyde reacted with the arsine compound, the reaction may occur spontaneously or after heating, usually up to 200° C. is sufficient. If the starting aldehyde or ketone is liquid, the reaction may be effected in the absence of a solvent and the reactant can be used in stoichiometric amounts. However, the reaction can also be effected in the presence of an inert organic solvent such as alkyl ethers such as diethyl ether.

The reaction has to be conducted under anhydrous conditions due to the hydrolysis-sensitivity of the tris-(amino) arsines and bis-(amino) intermediates formed in the reaction. Also, an inert atmosphere is required because of oxidation sensitivity of the enamines formed in the reaction. A preferred atmosphere is dry nitrogen.

The arsenic trioxide formed during the reaction occurs in the form of fine crystalline precipitate which can be easily separated from the liquid reaction medium by filtration or other suitable means. The recovered arsenic trioxide can then be used to form more tris-(sec.-amine) arsine for the reaction.

Examples of suitable aldehydes or ketones which can be used as starting materials for the process and having a hydrogen atom on the carbon α to the carbonyl group are aliphatic aldehydes and ketones of 2 to 18 carbon atoms such as acetaldehyde, n-butyraldehyde, propionaldehyde, valeraldehyde, nonaldehyde, palmitic aldehyde, butanone, 2-hexanone, pinacolin, etc.; aromatic aldehydes and ketones of 8 to 18 carbon atoms such as, α-tolualdehyde, acetophenone, propiophenone, 1-phenyl-2-propanone, 1,3-diphenyl-2-propanone, etc.; cyclic aldehydes and ketones of at least 4 carbon atoms such as cyclobutanone, cyclopentaenone, cyclohexanone, steroids having

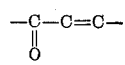

grouping such as 11-oxygenated Δ⁴-pregnene-3,20-diones described in U.S. Pat. No. 3,019,237, 17α-methyl-9α-fluoro-11-oxygenated-testosterones described in U.S. Pat. No. 2,990,400 and steroids described in British Pats. No. 885,756 and No. 887,080, etc.; and heterocyclic aldehydes or ketones such as 2-acetylpyridine, tropinone.

Examples of suitable tris-(sec.-amino)-arsines useful in the process of the invention are tris-(dilower alkyl amino) arsines such as tris-(dimethylamino)-arsine, tris-(ethyl methylamino)-arsine, tris-(dibutylamino)-arsine, etc.; and tris-(heterocyclic)-arsines such as tris-(pyrrolidino)-arsine, tris-(piperidino)-arsine, etc.

The process of the invention makes possible the synthesis of enamines in which the amino group is derived from a slightly volatile secondary amine in high yields even when elevated temperatures are required to form the enamine. For example, α-dimethylamino-styrene may be prepared in high yields (about 75% or higher) from acetophenone and tris-(dimethylamino)-arsine. The enamines prepared by the process of the invention are used for the preparation of heterocyclic compounds, as monomers for copolymerization with other compounds, as intermediates for the alkylation of certain steroids, intermediates for C-alkylation and C-acylation of ketones and aldehydes in the Stork reaction (Name Reactions in Organic Chemistry, Surrey, 2nd Ed., 1961, p. 231).

In a variation of the process of the invention, the tris-(sec.-amino)-arsine is reacted with an aldehyde or ketone which does not possess a hydrogen atom on the α-carbon in which case the corresponding bis-(sec.-amino)-compound is formed since no splitting of amine occurs in the absence of the α-hydrogen atom.

Examples of suitable aldehydes and ketones without an α-hydrogen atom are formaldehyde, paraformaldehyde, benzaldehyde, tolualdehyde, etc.

In the following examples there are described several preferred embodiments to illustrate the invention. However, it should be understood that the invention is not intended to be limited to the specific embodiments.

EXAMPLE I

Preparation of 1-dimethylamino-butene-1

20.0 ml. (appr. 107 mmol) of $As[N(CH_3)_2]_3$ were added dropwise and within the space of 10 minutes at room temperature and under an atmosphere of nitrogen, to a solution of 14.1 ml. (appr. 160 mmol) of n-butyraldehyde in 50 ml. of absolute diethyl ether. The addition of each single drop resulted in the instantaneous formation of a white precipitate ($As_2O_3$). During the dropwise addition, the diethyl ether heated itself to its boiling point and dimethylamine escaped. After filtering off the arsenic trioxide formed and distilling off the solvent and subsequent fractional distillation, 6.8 gm. of 1-dimethylamino-butene-1 (appr. 67% yield) were obtained in the form of a colorless liquid having a boiling point of 107° C. and an intensive, offensive odor. As the PMR-spectra verified, the product was not stable without decomposition.

EXAMPLE II

Preparation of 1-dimethylamino-cyclohexene-1

7.8 ml. (appr. 75 mmol) of cyclohexanone were added under a dry nitrogen atmosphree by means of a pipette to a solution of 9.5 ml. of $As[N(CH_3)_2]_3$ (appr. 50 mmol) in 50 ml. of absolute benzene, and the reaction mixture was then heated in a boiling water bath. After about 15 minutes, the reaction started with formation of arsenic trioxide and elimination of dimethylamine and the heating in the boiling water bath was continued for ½ hour. After filtering off the white powder ($As_2O_3$), evaporating in vacuum the solvent and distilling off the remaining liquid under water jet vacuum, 7.7 gm. of 1-dimethylamino-cyclohexene-1 (appr. 82% yield) in the form of an ill smelling, colorless liquid with a boiling point of 55° C./10 torr were obtained.

EXAMPLE III

Preparation of 3-dimethylamino-tropidine 7.0 gm. (appr. 50 mmol) of tropinone and 7.0 ml. (appr. 34 mmol) of $As[N(CH_3)_2]_3$ were heated in an oil bath under an atmosphere of nitrogen and formation of dimethylamine and the precipitation of arsenic trioxide started at a bath temperature of 110° C. After heating for 20 minutes at 120° C., the reaction was completed at which time the calculated amount of dimethylamine had formed and the calculated amount of arsenic trioxide had been precipitated. After separation of the reaction liquid from arsenic trioxide, distillation of the reaction liquid resulted in obtaining 7.2 gm. of 3-dimethylamino-tropidine (appr. 87% yield) in the form of a colorless liquid with a boiling point of 58° C./1 torr.

EXAMPLE IV

Preparation of α-dimethylamino-styrene 9.5 ml. (appr. 50 mmol of $As[N(CH_3)_2]_3$ and 8.8 ml. (appr. 75 mmol) of acetophenone were heated under a dry nitrogen atmosphere in a boiling water bath. The reaction began after 5 minutes with precipitation of a white powder ($As_2O_3$) and formation of dimethylamine and was completed after heating the reaction mixture for 10 minutes in the boiling water bath. After filtering off the arsenic trioxide (4.7 mg.=about 48 mmol of As) and distilling the resultant filtrate, 8.2 gm. of the desired α-dimethyl-amino-styrene (appr. 75% yield) in the form of a colorless liquid with a boiling point of 51° C./2.5 torr were obtained. The product had an unpleasant odor and upon standing (under an atmosphere of nitrogen, at admission of light and at room temperature), the product turned yellow.

EXAMPLE V

Preparation of 1-dimethylamino-1-(α-pyridyl)-ethylene 8.7 ml. (appr. 77 mmol) of 2-acetyl-pyridine were reacted under an atmosphere of nitrogen and at room temperature, with 10.0 ml. (appr. 53 mmol) of $$As[N(CH_3)_2]_3$$

After 5 minutes, an intensive reaction set in during which $As_2O_3$ was precipitated and dimethylamine escaped and after 1 minute, the reaction had abated. For the purpose of splitting off and expelling more dimethylamine, the flask was heated at 120° C. for 10 minutes. After cooling to room temperature, the reaction mixture was admixed with 40 ml. of absolute diethyl ether and thereafter 4.9 gm. (appr. 50 mmol of As) of arsenic trioxide were filtered off. After removing the solvent from the filtrate and by distilling the remaining residue, 9.0 gm. of 1-dimethylamino-1-(α-pyridyl)-ethylene (79% yield) were obtained in the form of a colorless liquid having a boiling point of 53° C./1.5 torr and with an odor similar to that of pyridine.

EXAMPLE VI

Preparation of benzylidene-bis(dimethylamine)

19.0 ml. of benzaldehyde (appr. 188 mmol) were added dropwise under a dry nitrogen atmosphere and at a temperature of 0° C. to 23.0 ml. (appr. 125 mmol) of $As[N(CH_3)]_3$ within the space of 10 minutes. Each single drop of this mixture resulted in the instantaneous formation of arsenic trioxide. After filtering off the white powder ($As_2O_3$) and distilling the resultant filtrate, 24.5 gm. of benzylidene-bis-(dimethylamine) (appr. 73% yield) were obtained in the form of a colorless liquid having a very pronounced hydrolysis-sensitivity and a boiling point of 51° C. at 2 torr.

EXAMPLE VII

Preparation of methylene-bis(dimethylamine)

4.5 gm. (appr. 150 mmol) of paraformaldehyde and 19.0 ml. (appr. 100 mmol) of $As[N(CH_3)_2]_3$ were admixed in a small flask, which was connected to a microtrap by means of a 10 cm. long supply column and equipped with a magnetic stirrer and oil bath. The entire apparatus was filled with dry nitrogen. Then, the oil bath was heated under continuous stirring and when a bath temperature of 80° C. had been attained, a colorless liquid started to distill off. After another 15 minutes and reaching a bath temperature of 120° C., a colorless liquid was passed over into the receiver flask in slowly successive drops. The temperature of the oil bath was then increased from 120° to 180° C. within the space of 45 minutes so that the continuously colorless liquid which was methylene-bis (dimethylamine), was passed into the flask in moderately rapid successive drops. At an oil bath temperature of 190° C., a vigorous reaction suddenly set in and caused a few ml. of methylene-bis (dimethylamine) to distill over very rapidly, whereby solid substances entered into the distillation trap. The yield of the desired methylene-bis (dimethylamine) amounted to 12.8 gm. (84% yield) and the product obtained occured in the form of a highly hydrolysis-sensitive, colorless liquid having a boiling point of 77° C., and smelling strongly of formaldehyde and also slightly of dimethylamine.

EXAMPLE VIII

Preparation of 1-piperidino-cyclohexene-1

11.0 gm. (appr. 34 mmol) of tris-piperidino)-arsine and 5.2 ml. (appr. 50 mmol) of cyclohexanone were heated under an atmosphere of nitrogen. Upon the attaining a temperature of 30° C., precipitation of $As_2O_3$ started and was completed at a temperature of about 60° C. After the reaction mixture had been cooled, it was admixed with 20 ml. of absolute diethyl ether, and the $As_2O_3$ was filtered off. Fractional distillation of the filtrate supplied 6.2 gm. of 1-piperidino-cyclohexene-1 (appr. 75% yield) in the form of a colorless liquid having an unpleasant odor and a boiling point of 70° C. at 2 torr.

EXAMPLE IX

Preparation of α-piperidino-styrene 11.0 gm. (appr. 34 mmol) of tris-(piperidino)-arsine and 6.0 ml. (appr. 50 mmol) of acetophenone were heated to a high temperature under an atmosphere of nitrogen. At an oil bath temperature of 170° C., the reaction liquid started to boil vigorously due to the formation of free piperidine. After the reaction liquid had been cooled, it was admixed with 20 ml. of absolute diethyl ether and 302 mg. of $As_2O_3$ (appr. 33 mmol As) were filtered off. Fractional distillation of the filtrate supplied 7.6 gm. of α-piperidino-styrene (appr. 81% yield) in the form of a colorless liquid having a boiling point of 74° C. at 1.5 torr.

EXAMPLE X

Preparation of 1-pyrrolidino-cyclohexene-1

10.0 ml. (appr. 42 mmol) of tris-(pyrrolidino)arsine were admixed at room temperature and under an atmosphere of nitrogen with 6.5 ml. (appr. 63 mmol) of cyclohexanone. An exothermic reaction with precipitation of $As_2O_3$ occurred immediately and was completed after ½ minute. After admixing the reaction mixture with 20 ml. of absolute diethyl ether, the $As_2O_3$ was filtered off. After removing the diethyl ether, evaporating in vacuum the pyrrolidine and subsequent distillation of the remaining liquid, 7.9 gm. (appr. 83% yield) of 1-pyrrolidino cyclohexene-1 were obtained in the form of a colorless liquid of unpleasant odor and having a boiling point of 56° C. at 1 torr.

EXAMPLE XI

Preparation of α-pyrrolidino-styrene 10.0 ml. (appr. 42 mmol) of tris-(pyrrolidino)arsine and 7.5 ml. (appr. 63 mmol) of acetophenone were heated together under an atmosphere of nitrogen. At a temperature of 80° C., the rapidly proceeding reaction started with precipitation of $As_2O_3$. After admixing the reaction mixture with 20 ml. of absolute diethyl ether, $As_2O_3$ was filtered off, and then diethyl ether and pyrrolidine were distilled off under vacuum at room temperature. The raw α-pyrrolidino-styrene started to polymerize with simultaneous decomposition under the conditions of the distillation. However, it was possible to distill off 2.7 gm. (appr. 25% yield) of α-pyrrolidino-styrene from the polymerizing raw product at considerably elevated oil bath temperature. The product occurred in the form of a colorless liquid with an offensive odor and a boiling point of 75° C. at 1 torr.

Various modifications of the process of the invention may be made without departing from the spirit or scope thereof.

I claim:

1. A process for the preparation of an enamine of the formula

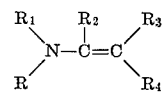

wherein R and $R_1$ are lower alkyl radicals of 1 to 7 carbon atoms and when taken together with the nitrogen atom to which they are attached are piperidino or pyrrolidino and $R_2$, $R_3$ and $R_4$ are selected from the group consisting of hydrogen, alkyl of 2 to 18 carbon atoms and monocyclic aromatic of 8 to 18 carbon atoms and $R_2$ and $R_3$ when taken together with the carbon atoms to which they are bonded form a cycloalkyl of 4 to 6 carbon atoms, oxygenated pregnenediones, oxygenated testosterones, tropan or pyridine which comprises reacting under anhydrous conditions a carbonyl compound of the formula

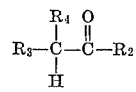

wherein $R_2$, $R_3$ and $R_4$ have the above definitions in an inert atmosphere with a tris-(sec. amino)-arsine of the formula

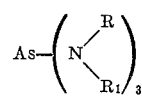

wherein R and $R_1$ have the above definitions to form the corresponding enamine.

2. The process of claim 1 wherein the arsine is tris-(dimethylamino)-arsine.

3. The process of claim 1 wherein the arsine is tris-(piperidino)-arsine.

4. The process of claim 1 wherein the arsine is tris-(pyrrolidino)-arsine.

5. The process of claim 2 wherein the carbonyl compound is acetophenone.

References Cited

Nelson et al., J. Chem. Soc., p. 5142–5144 (1965).
Weingarten et al., J. Org. Chem., vol. 31, pp. 4041–4042 (December 1966).

JOHN D. RANDOLPH, Primary Examiner

U.S. Cl. X.R.

23—144; 260—89.7, 292, 293, 296, 563, 326.8, 397.3, 583, 570.8